Feb. 28, 1961 W. SCHULLER 2,973,190
HEATING DEVICE
Filed May 12, 1955

INVENTOR
Werner Schuller

BY Morgan, Finnegan, Durham
& Pine
ATTORNEYS

United States Patent Office 2,973,190
Patented Feb. 28, 1961

2,973,190
HEATING DEVICE

Werner Schuller, 88 Lawton Road, Alsager, England

Filed May 12, 1955, Ser. No. 507,921
In Great Britain Apr. 24, 1948

Public Law 619, Aug. 23, 1954
Patent expires Apr. 24, 1968

4 Claims. (Cl. 263—2)

The present invention relates to a novel heating device for producing filaments from rods, and in particular to the production of glass filaments or threads drawn from glass rods.

Objects and advantages of the invention will be set forth in part hereinafter and in part will be obvious herefrom, or may be learned by practice with the invention, the same being realized and attained by means of the parts, constructions, arrangements, combinations and improvements pointed out in the appended claims.

The invention consists in the novel parts, constructions, arrangements, combinations and improvements herein shown and described.

An object of my invention is to provide a heating device whereby rods, and in particular glass rods, may be simultaneously heated to the same extent.

Another object of my invention is to provide a heating device for heating rods, and in particular glass rods, which is not readily deformed.

A still further object of my invention is to provide a heating device for rods, and in particular glass rods, by which rods may be heated to the desired viscosity.

It is known to heat the ends of glass rods disposed in close parallel relationship by gas-flames, and to draw-off glass filaments by means of a rotating drawing-drum. It is also known to act upon the ends of the glass rods by means of electrical heating spirals, which extend along both sides of the rows of glass rods, and which are secured in a support which is itself secured on a stationary part of the device. The heating spirals rest on the support with approximately ⅕ to ¼ of their circumference in contact with the support. Such heating spirals are difficult to maintain in such a position that the centers of the helical windings will all lie in a straight line, and so that the windings are the same distances throughout from the row of glass rods, so that the rods are all heated to the same extent. These heating spirals are very sensitive in operation and are easily deformed, particularly because the parts of the windings remote from the glass rods radiate a lesser proportion of the heat evolved than the parts of the windings adjacent the glass rods. It is possible that an electrical transference occurs between the individual windings by reason of oscillation, or because of the adherence of foreign particles to the windings thus destroying the spirals by short circuiting them.

Difficulties are experienced, moreover, in creating the right viscosity of the glass to ensure against the threads breaking at the position where the filament is drawn-off from the rods.

In order to describe the invention more specifically, reference is now made to the drawings.

The accompanying drawings, referred to herein and constituting a part hereof, illustrate different embodiments of the invention and, together with the description, serve to explain the principles of the invention.

Figure 1:
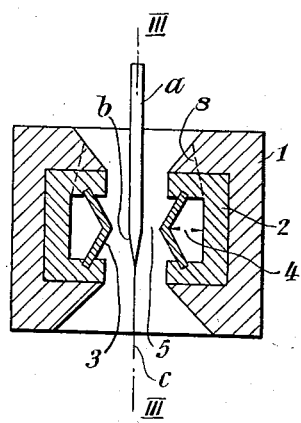
Figures 1 and 2 are cross-sectional elevations of two constructions of a heating device according to the invention.
Figure 3:
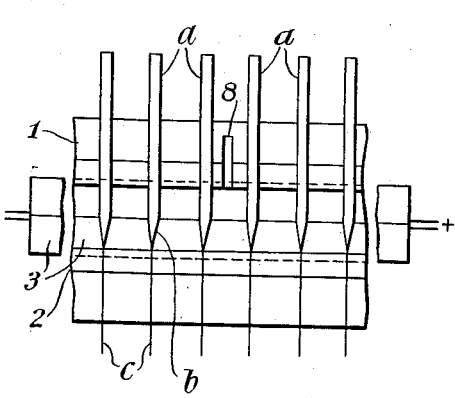
Figures 3 and 4 are longitudinal sections along the lines III—III, and IV—IV respectively, of Figures 1 and 2.
Figure 2:
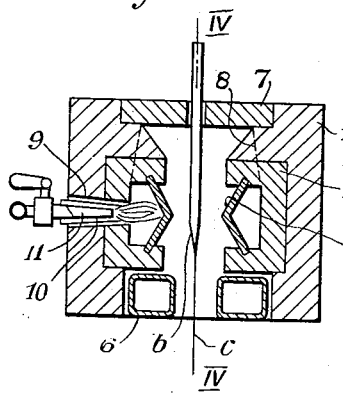

In the drawings a are glass rods disposed in parallel. 1 is an electrical heating device extending along the length of a row of glass rods. 2 are U-shaped heat-insulating supports or mountings for heating elements 3, provided with the open side directed inwardly, in oppositely disposed cavities provided for their reception on each side of the inner walls of the furnace. The heating elements consist of heating strips 3 which are fitted into top and bottom inwardly extending flanges 2a of vertical supports or mountings 2 at distances from the vertical walls of the supports indicated by the reference 4, as shown in Figures 1 and 2. It is thus possible for the heating strips 3 to radiate heat both inwardly and outwardly and thus to ensure against bending of the strips. In order to provide an additional safeguard against bending, it is desirable that the heating elements be of such construction so as to provide a passageway therebetween, having an area of reduced cross-section intermediate its ends. By providing a reduced cross-sectional area, it is possible to effectuate a high concentration of heat in a narrow zone at a position where it is needed the most, that is, in the neighborhood of the spinning position B of the glass rods A. Hence, high viscosity of the glass at the spinning position may be obtained, which is particularly important for avoiding breaking of filaments at this position. Examples of heating strips which provide the desired reduced cross-sectional area are angle section strips, T section strips or arched section strips, as illustrated in Figures 1, 2, 5 and 6 of the drawings.

In such a construction, it may happen that the glass-thread c originating from the glass rods at the spinning position, owing to the high viscosity of the glass, does not have the necessary strength at this position to stand the pull acting on it. It is therefore preferred, as shown in the construction illustrated in Figure 2 of the drawings, to provide, as near as possible below the heating strips 3, cooling means 6 which may be formed as tubes of substantially right-angle section and supplied in any convenient manner with cooling liquid. The cooling means 6 serve to congeal or harden the highly viscous glass-thread near the spinning position, thus avoiding breaking.

According to the kind of thread to be manufactured, the heating device may be open at the top (Figure 1), or covered by a cover plate 7 (Figure 2). The first modification is particularly suitable for fine glass threads, for example of 2–5μ, where the glass rods have to be fed relatively slowly.

The ends of the heating device 1 are normally closed, but if desired, openings may be provided to enable heat and exhaust gases to escape from the interior of the heating device to the outside.

Figure 4:
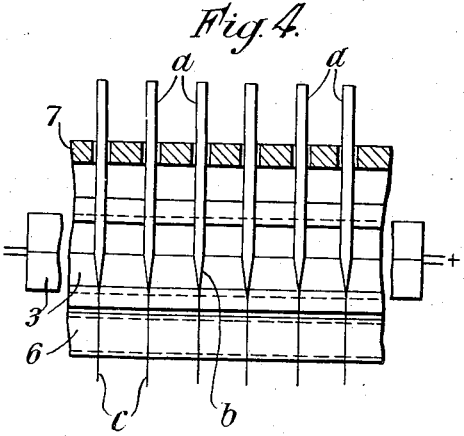
Figure 5:
Figures 5 and 6 are cross-sections through modified constructions of the heating elements.
Figure 6:

In the modification illustrated in Figures 2 and 4 the heating may be by gas. For the purpose, a number of transverse openings 9 are provided in the vertical walls of the furnace and in the supports or mountings 2. Into the openings 9, serving as mixing chambers 10, project gas burners having jets 11, the flames from which heat the strips 3.

One or more openings 8, or the equivalent, may be provided in the upper flanges of the U-shaped support 2, to permit the heat from the middle parts of the device to escape upwardly between the heating strips and wall of the support. Thus no sufficient differences in temperature arise over the length of the heating strips to cause bending of the strips.

The heating strips are preferably made of alloy of high specific resistance having low co-efficients of variation of properties, with temperature, for example, low variation of resistance with temperatures, and may advantageously be made of the substances known under the trade names "Nickelin" or "Constantan."

The invention in its broader aspects is not limited to the specific combinations and improvements described but departures may be made therefrom within the scope of the accompanying claims without departing from the principles of the invention and without sacrificing its chief advantages.

I claim:
1. A heating device comprising a member formed with oppositely disposed walls to present an opening into which opening are continuously fed the ends of glass rods from which filaments are to be drawn, supports mounted at opposite positions in the walls of said member, each of said supports being provided with vertical parts and inwardly directed flanges at top and bottom of said vertical parts, strip metal heating members for radiating heat inwardly on to the ends of the rods, said heating members being mounted to extend between the top and bottom flanges in such manner as to leave a space between each strip metal member and the vertical part of the support.

2. A heating device as defined in claim 1, wherein the heating elements provide a passageway therebetween of reduced cross-section intermediate its ends.

3. A heating device as defined in claim 1, wherein cooling means are provided at a position below the heating strips.

4. A heating device as defined in claim 1, wherein openings are provided in the upper parts of the supports.

References Cited in the file of this patent
UNITED STATES PATENTS

| | | |
|---|---|---|
| 1,653,848 | Grotta | Dec. 27, 1927 |
| 2,206,060 | Slayter | July 2, 1940 |

FOREIGN PATENTS

| | | |
|---|---|---|
| 1,082,549 | France | Dec. 30, 1954 |
| 671,035 | Great Britain | Apr. 30, 1952 |
| 68,921 | Norway | Feb. 26, 1945 |